No. 722,849. PATENTED MAR. 17, 1903.
W. KESSELRING.
ROSE FOR SHOWER BATHS.
APPLICATION FILED JULY 28, 1902.
NO MODEL.
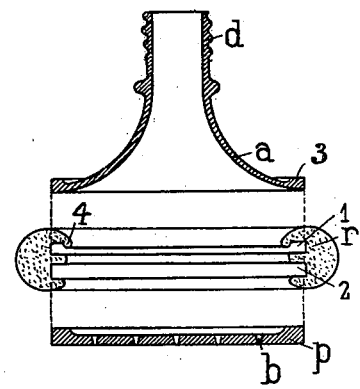
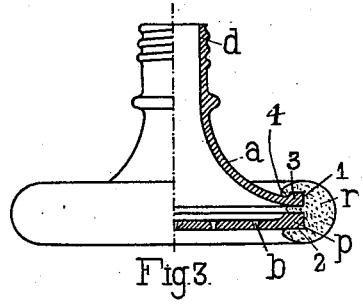
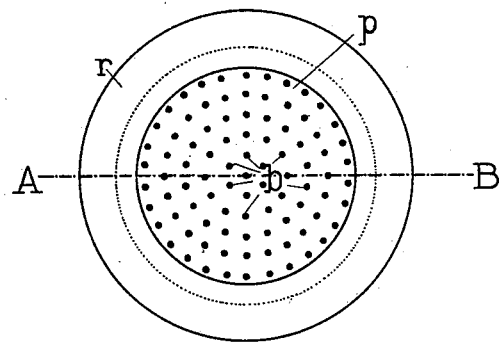
Witnesses.
C. H. Schuring
Paul Arras.
Inventor.
Wilhelm Kesselring
by Paul F. Schilling
attorney

UNITED STATES PATENT OFFICE.

WILHELM KESSELRING, OF STRASBURG, GERMANY.

ROSE FOR SHOWER-BATHS.

SPECIFICATION forming part of Letters Patent No. 722,849, dated March 17, 1903.

Application filed July 28, 1902. Serial No. 117,343. (No model.)

*To all whom it may concern:*

Be it known that I, WILHELM KESSELRING, a subject of the Emperor of Germany, residing at Strasburg, Germany, have invented certain new and useful Improvements in Roses for Shower-Baths, of which the following is a specification.

The present invention has reference to improvements in roses for shower-baths, and relates more especially to a rose which can easily and quickly be taken apart for cleaning or repairing purposes and can be assembled again without the use of instruments.

In order to make my invention more readily understood, I will now describe it with reference to the accompanying sheet of drawings, of which—

Figure 1 represents a sectional elevation of the three essential parts forming the rose in disconnected state. Fig. 2 represents partly a sectional elevation, partly a side view, of a rose according to the present invention in working shape. Fig. 3 shows the under face of the rose.

The roses of shower-baths now in use easily oxidize under the influence of mineral water and are generally so constructed as to prevent a taking apart for cleaning or repairing purposes.

The new rose can easily be taken apart and assembled again. The part $d$ of the funnel-shaped top part $a$ is corrugated, so as to more easily retain the rubber connecting-tube, or is provided with a screw-thread for rigid connection with the supply-pipe. The part $a$ may be made of glass, hard rubber, porcelain, or metal, as also the lower face-plate $p$, with perforations $b$. The two parts $a$ and $p$ are connected by means of a rubber ring $r$, provided with interior annular grooves 1 and 2. In assembling the parts the rubber ring is stretched and clamped over the two parts $a$ and $p$, as shown in Fig. 2, when it will watertightly clamp the parts together. The rubber ring also serves to protect the rose when being knocked about.

If no metal is used, formation of oxid of course is excluded, or in case metal parts are made use of the rose may easily be taken apart for removing the oxid.

In order to give the rubber ring a better hold upon the part $a$, the latter may be provided with a flange 3 and the rubber ring with a corresponding annular ledge 4, which coöperates with the said flange, as shown in Fig. 2.

What I claim, and desire to secure by Letters Patent, is—

1. A rose for shower-baths, comprising an influx part, a perforated face-plate, a rubber ring connecting the said influx part and said face-plate, and means for connecting the said influx part to the supply-pipe, substantially as and for the purpose specified.

2. A rose for shower-baths, comprising an influx part, a circumferential flange on said influx part, a perforated face-plate, a rubber ring with internal grooves, adapted to receive the said influx part and said face-plate, and an annular ledge on the said rubber ring, adapted to coöperate with the said circumferential flange, substantially as and for the purpose set forth.

In witness whereof I have hereunto set my hand in presence of two witnesses.

WILHELM KESSELRING.

Witnesses:
 FERDINAND KAUBER,
 CARL FRIEDRICH KRIEG.